Sept. 7, 1948.  L. G. GILBERT  2,448,709
DEVICE TO REGULATE DEPTH OF GASOLINE
IN THE FLOAT CHAMBER OF CARBURETORS
Filed Oct. 30, 1943  6 Sheets-Sheet 1
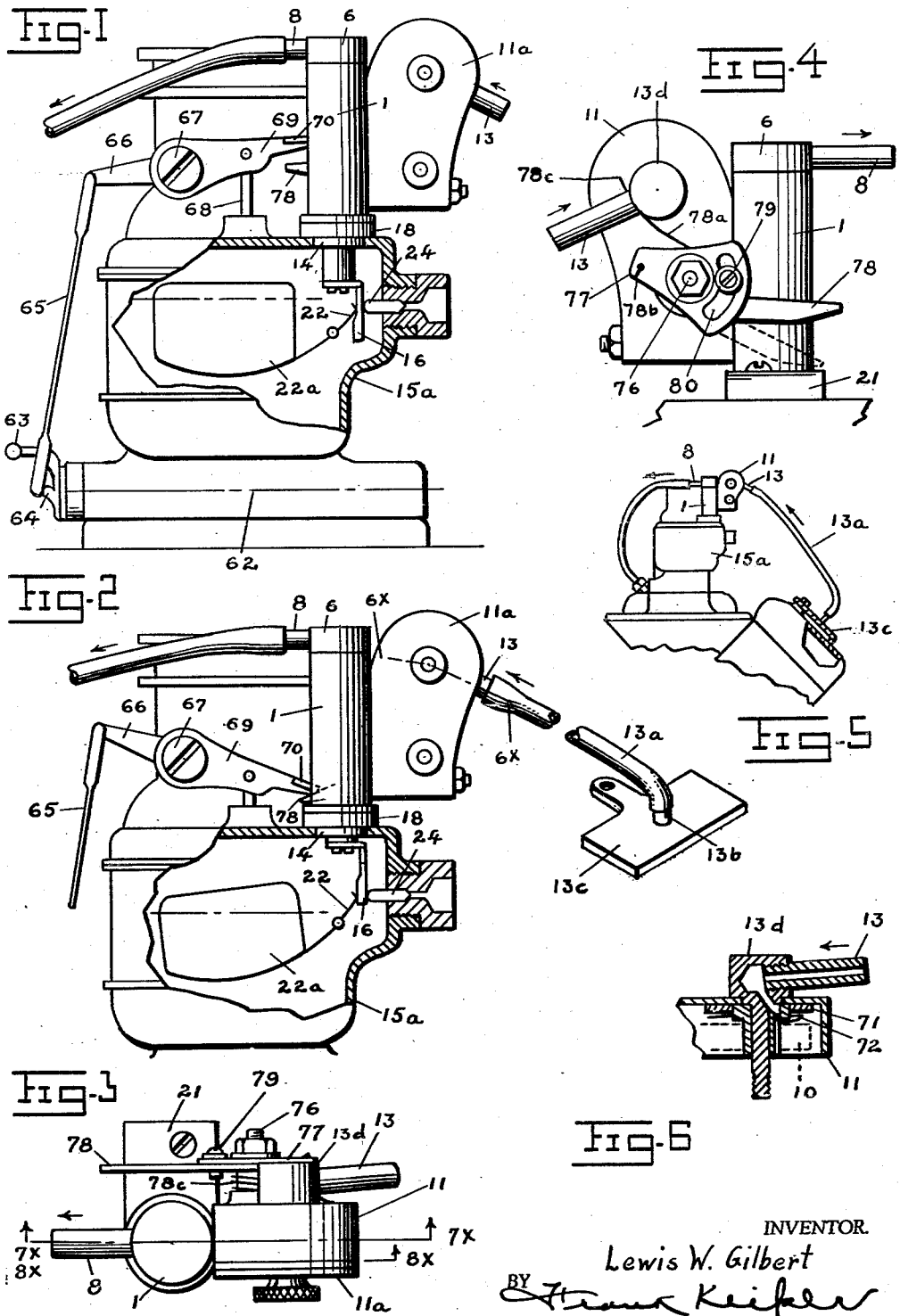
INVENTOR.
Lewis W. Gilbert
BY Frank Keifer
ATTORNEY.

Sept. 7, 1948. L. G. GILBERT 2,448,709
DEVICE TO REGULATE DEPTH OF GASOLINE
IN THE FLOAT CHAMBER OF CARBURETORS
Filed Oct. 30, 1943 6 Sheets-Sheet 2

INVENTOR.
Lewis W. Gilbert
BY Frank Keifer
ATTORNEY.

Sept. 7, 1948.　　　　　L. G. GILBERT　　　　　2,448,709
DEVICE TO REGULATE DEPTH OF GASOLINE
IN THE FLOAT CHAMBER OF CARBURETORS
Filed Oct. 30, 1943　　　　　　　　　　　　　　6 Sheets-Sheet 3

INVENTOR.
Lewis W. Gilbert
BY Frank Keifer
ATTORNEY.

Sept. 7, 1948.  L. G. GILBERT  2,448,709
DEVICE TO REGULATE DEPTH OF GASOLINE
IN THE FLOAT CHAMBER OF CARBURETORS
Filed Oct. 30, 1943  6 Sheets-Sheet 4

INVENTOR.
Lewis W. Gilbert
BY Frank Keifer
ATTORNEY.

Sept. 7, 1948.  L. G. GILBERT  2,448,709
DEVICE TO REGULATE DEPTH OF GASOLINE
IN THE FLOAT CHAMBER OF CARBURETORS
Filed Oct. 30, 1943  6 Sheets-Sheet 5

INVENTOR.
Lewis W. Gilbert
BY Frank Keifer
ATTORNEY.

Sept. 7, 1948.  L. G. GILBERT  2,448,709
DEVICE TO REGULATE DEPTH OF GASOLINE
IN THE FLOAT CHAMBER OF CARBURETORS
Filed Oct. 30, 1943  6 Sheets-Sheet 6
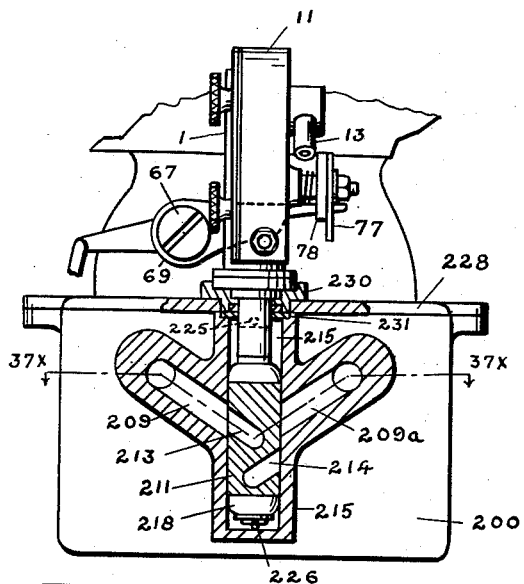
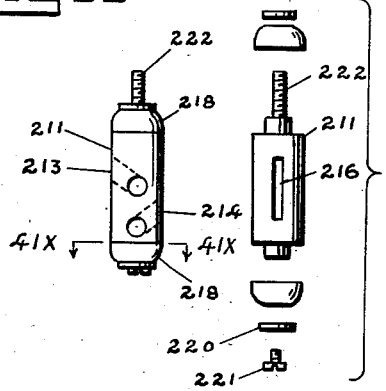
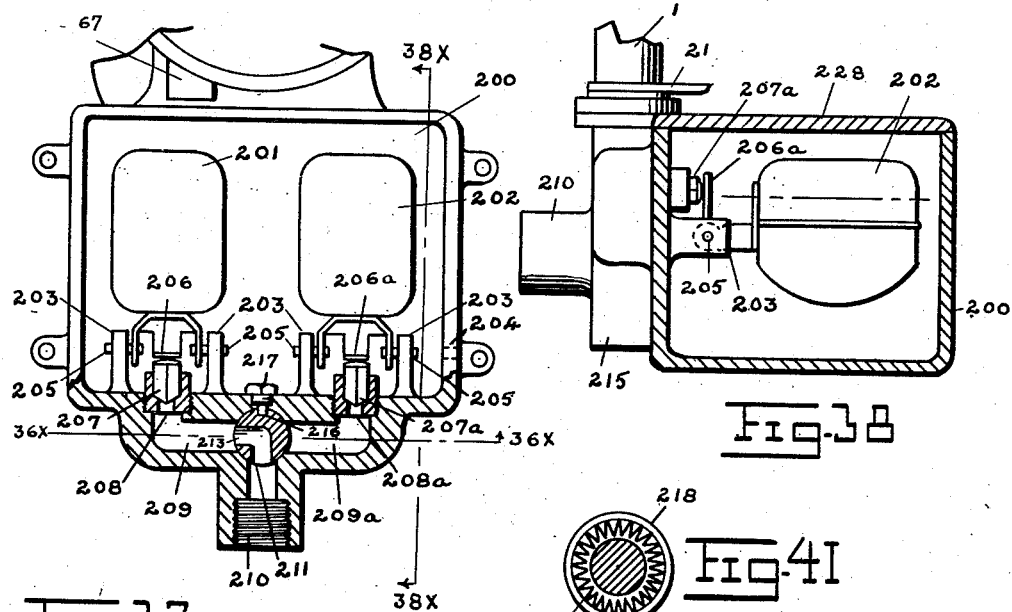
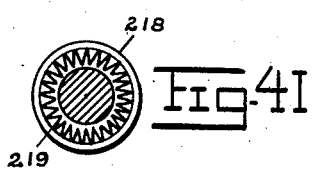
INVENTOR.
Lewis W. Gilbert
BY
ATTORNEY.

Patented Sept. 7, 1948

2,448,709

UNITED STATES PATENT OFFICE 2,448,709

DEVICE TO REGULATE DEPTH OF GASOLINE IN THE FLOAT CHAMBER OF A CARBURETOR

Lewis W. Gilbert, Bradford, Pa., assignor to Frank Keiper, Rochester, and Nora E. B. Gilbert, Seneca Falls, N. Y.

Application October 30, 1943, Serial No. 508,407

19 Claims. (Cl. 123—119)

The object of this invention is to produce a device that will regulate the depth of gasoline in the float chamber of the carburetor so as to save gasoline and get out of the gasoline more miles per gallon; and more power.

Another object of the invention is to provide a regulating device that will permit the car to get started with the normal level of gasoline in the carburetor which level will remain normal until the motor warms up and then the level will be automatically lowered to a predetermined level for a higher mileage per gallon of gasoline.

Another object of the invention is to provide means that will hold the gasoline at normal level in the float chamber of the carburetor until the engine heats up and thereafter lower the level of the gasoline in the float chamber to a predetermined level by a combined action of vacuum and thermostatic control and from then on while the engine runs the level of gasoline in the float chamber will be permitted to rise if the vacuum in the intake manifold falls.

Another object is to adapt the invention to carburetors in which the needle valve moves horizontally to admit the gasoline to the float chamber and to carburetors in which the needle valve moves vertically to admit the gasoline to the float chamber.

Another object of the invention is to provide a control for the level of the gasoline in the float chamber that will hold the gasoline at a low level after the engine has heated up and during temporary fluctuations of the vacuum in the intake manifold due to uneven driving or manipulation of the accelerator.

Another object of the invention is to control the movement of the needle valve by means of a piston that is coupled with a diaphragm.

Another object of the invention is to pivot the float on a bearing that moves up and down in the carburetor with the piston, the arm on which the float is carried making contact with the needle valve by which the float is depressed when the assembly of piston and pivot of the float is moved up.

Another object of the invention is to provide the piston with a diaphragm, the piston and diaphragm moving up and down in the diaphragm chamber by which piston the float can be depressed either by a wedge used in the type of carburetor where the needle valve moves horizontally or by which it raises and lowers an assembly of an arm and a pivot on which the float is carried against a needle valve that moves vertically in the top of the carburetor.

In the drawings

Figure 1 is a side elevation of the carburetor in combination with my improved thermostatic control device, the thermostatic control device being shown placed outside of and on top of the carburetor such as is used in the Ford car and the float chamber of the carburetor being shown partly broken away and in section showing the piston and wedge in its lowest position and the float in the highest position.

Figure 2 shows the same carburetor as is shown in Figure 1 with the piston and wedge raised to its highest position and the float moved to a lower position; Figure 2 also shows the housing that is attached to the engine for the purpose of forming a pocket in which the air is warmed.

Figure 3 is a top plan view of the thermostatic control device shown in Figure 1 with the carburetor omitted.

Figure 4 is a rear elevation of the thermostatic control device viewed from the side opposite from that shown in Figure 1.

Figure 5 is a diagrammatic view of the thermostatic control device as applied to the engine and the carburetor of the Ford type having an engine of the V-8 type.

Figure 6 is a sectional view of the air intake of the thermostat chamber, the section being taken on the line $6x$—$6x$ of Figures 2 and 11.

Figure 36 is a side elevation of a carburetor body partly in vertical section, the section being taken on the line 36x—36x of Figure 37. This carburetor has a large float chamber and a control valve.

Figure 37 is a top plan view of the carburetor with the cover of the float chamber removed some of the parts being shown partly in section, the section being taken on the line 37x—37x of Figure 36. This figure shows two floats and two needle valves in the float chamber and a control valve.

Figure 38 shows a vertical section through the float chamber of the carburetor the section being taken on the line 38x—38x of Figure 37.

Figure 39 is a detail view of the control valve shown in front elevation, the position of the valve being the same as is shown in Figure 36.

Figure 40 is a rear elevation of the control valve shown in Figure 39 with the parts of the assembly spaced apart.

Figure 41 is an enlarged detail view of the bushing shown at the top and bottom of the control valve shown in Figures 39 and 40 the section being taken on the line 41x—41x of Figure 39.

In the drawings, like numerals indicate like parts.

Figure 7:
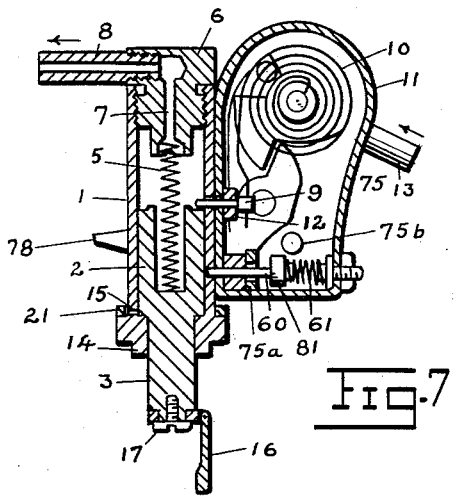
Figure 7 is a vertical section on the line $7x$—$7x$ of Figure 3 showing the piston locked in its lowest position.

In the drawings reference 1 indicates a cylinder having a piston 2 therein to which piston is attached the stem 3 at the bottom thereof. This piston is capable of movement up and down in the cylinder being moved up in response to a vacuum developed in the cylinder above the piston and being normally held down by a spring 5 which is contained in the cylinder. The top of the cylinder is closed by a screw plug 6 in which is provided an opening 7 which extends up to near the top of the plug and then opens laterally. The plug 6 acts as a stop for the piston. A so-called straight elbow may be used for this purpose. A tube 8 is threaded into this opening to provide a simple and easy manner of connecting the tube to the intake manifold so that the vacuum produced therein while the engine is running will raise the piston and compress the spring.

When the engine is cold or until the engine heats up the piston 2 is mechanically held against being raised by a lockpin 9, the position of which is controlled by a thermostat spring 10 carried in the chamber or housing.

Figure 12:
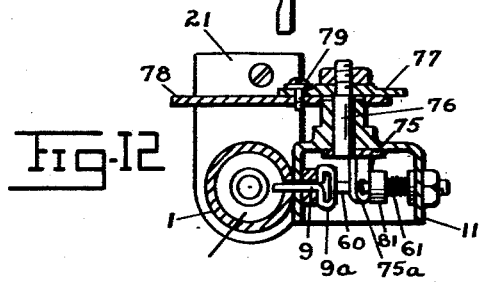
Figure 12 is a section on the line $12x$—$12x$ of Figure 9 looking down.
Figure 13:
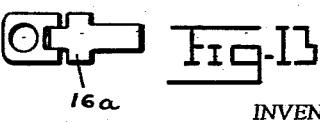
Figure 13 is a detail view of the wedge and the plate on which it is hinged both parts being shown in the same plane.

The thermostat housing or the chamber 11 is connected to the inside of the cylinder 1 by a tube 12 in which the lockpin 9 loosely fits. When the engine starts, a vacuum is produced in the intake manifold and this in turn produces a vacuum in the cylinder 1 and draws air through the tube 12 past the pin 9. The air flows from the housing of the thermostat chamber 11. The pin 9 is shown in Figure 12 formed with a loop 9a in which the thermostat spring 10 engages. This loop 9a engages with the tube 12 and prevents the pin from being pushed into the cylinder too far by the thermostat spring. This loop 9a also pulls the pin out from the cylinder.

Figure 8:
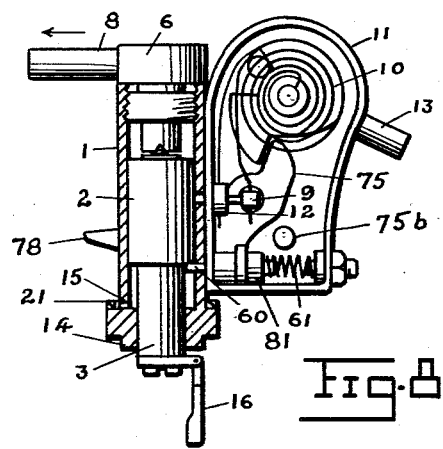
Figure 8 is a section on the line $8x$—$8x$ of Figure 3 showing the piston locked in its highest position.

Extending from this chamber or housing 11 is a tube 13 that extends to some hot spot on the motor or on the exhaust manifold. By hot spot I means preferably some part of the engine that will not warm up to its maximum temperature until the cooling water has warmed up. Until the engine or the exhaust manifold heats up cold air will be drawn through this tube 13 and through the tube 12 into the intake manifold and as long as this condition exists the locking pin 9 will engage the top of the piston 2 and prevent it from rising in response to the vacuum. Except for the tubular openings the thermostat chamber is sealed up being closed on one side by the cover plate 11a having a layer of leather used as a gasket interposed between the housing 11 and the plate 11a so as to make a joint that is substantially airtight. But as soon as the hot spot on the motor or the exhaust manifold heats up, the warm air drawn in through the tube 13 will gradually cause the thermostat spring 10 to flex and will draw the lockpin to the right as shown in Figure 8, thus releasing the piston 2 which can then rise in response to the urge of the vacuum. The movement of the thermostat spring 10 to the right in Figure 2 is limited by the amount of flex in the spring.

The opening 7 is larger and will pass more air than will the clearance in the tube 12 around the pin 9. Consequently the vacuum in the cylinder 1 will be greater than the vacuum in the thermostat chamber 11 and will be great enough to raise the piston and compress the spring 5. When the piston 2 rises it will partly close the opening in the tube 12, thus causing the vacuum in the cylinder 1 to act with extra force in raising the piston 2.

To permit air to enter the cylinder below the piston the stem 3 can be made with a loose fit, in the cylinder head 14 and with which it makes engagement or an opening 15 can be provided through the side of the cylinder 1 at or near the bottom of the cylinder.

In this way the piston 2 can be made to raise and compress the spring 5 whenever there is a sufficient vacuum developed in the intake manifold.

To regulate the level of the gasoline in the float chamber 15a, I provide wedge 16 connected to the stem 3 below the piston. The wedge is in the form of an angle-shaped bracket which is loosely fastened to the bottom on the stem 3 by the screw 17 and it is held loosely thereon so that it can rock back and forth with a floating motion as it adjusts itself between the head of the needle valve 24 and the end of the arm 22 on the float 22a. The wedge bracket can be made in two parts, one of which is hinged on the other.

The cylinder shown in Figure 7 is provided at the lower end with a flange 18 and a reduced end 14. An opening is provided in the top of the float chamber of the carburetor in which this reduced end makes a snug fit. See Figures 1 and 2. A strap or plate 21 is provided having an opening therein that fits around the outside stationary cylinder 1 and this strap 21 is fastened to the top of the float chamber 15a of the carburetor by a screw or in any other suitable manner. The strap is shown in full lines in Figure 3. The stem 3 with the wedge 16 extends down into the float chamber, the wedge being interposed between the end of the float arm 22 and the needle valve 24. When the motor is cold the parts will be held in the position shown in Figure 7 by the lockpin 9 in which the thin part of the wedge 16 is interposed between the end of the float arm 22 and the end of the float needle valve 24.

While the parts are in this position the float takes the position shown in Figure 1, this being the normal level of gasoline in the carburetor as recommended by the carburetor manufacturers.

When the engine starts this level will be maintained until the hot spot has become heated up and until the thermostat spring 10 has pulled the lockpin 9 to the right as in Figure 8. Then the vacuum of the intake manifold can raise the piston 2 and in so doing it will raise the wedge 16 which will close the float needle valve 24 until the level of the gasoline in the float chamber has dropped permitting the float to drop, thereby releasing the float needle valve so the gasoline can again flow into the float chamber. So that the air drawn from the hot spot will not fluctuate much in temperature I use a suitable tube 13a connected to a tube 13b fastened in a housing 13c shown in Figure 2. This housing is closed on all sides but one and is fastened to the engine or manifold so as to cover the hot spot. It helps the heating of the air.

In addition to the pin 9 which holds the piston 2 down until the thermostat spring 10 has warmed up I also provide a pin 60. This pin 60 is normally held in contact with the outside of the piston 2. When the pin 9 is withdrawn by the thermostat spring the vacuum in the cylinder 1 will draw the piston 2 up until it passes the pin 60. This will release the pin 60 which is pressed forward by the spring 61 until it engages under the piston 2 and holds it from moving down again. While the pin 60 holds the piston 2 up the pin 9 will be held back by the thermostat spring as long as it remains warm and the pin 9 will ride against the piston 2 after the thermostat spring has cooled off. As long as this condition exists the parts will cooperate to hold the float down in the float chamber and hold the level of gasoline at the lower level regardless of the variations in the vacuum due to increase or decrease of speed within certain limits and due to variations in the opening of the throttle valve. It is desirable to hold the level of the gasoline in the float chamber down so as to get a lean mixture except when it is necessary suddenly to increase the power for more rapid acceleration or for climbing a steep incline with a wide open throttle.

In such case it is necessary to temporarily raise the level of the gasoline in the float chamber to the normal level so as to get the rich mixture instead of the lean mixture. For this purpose it will be necessary to withdraw the pin 60 so that the piston 2 can descend and release the float so that the float can rise and raise the level of the gas in the float chamber. This will change the lean mixture to a rich mixture.

The mechanism by which the pin 60 is withdrawn when the throttle is wide open or nearly so will now be described.

It will be understood that in every car there is an accelerator pedal and this accelerator pedal is connected in some suitable way to the shaft of the throttle valve in the carburetor, so that the throttle is opened and closed by the moving of the pedal. The axis of the throttle valve is indicated by the reference numeral 62. On the end of this axis is the crank 63 to which the accelerator rod connects. On the axis of the throttle valve is also a crank 64 to which is connected a link 65 that operates a rocker arm 66 which swings on a screw 67. This rocker arm operates the accelerator pump 68 which constitutes no part of my invention. To this accelerator arm I add an extension 69 on which is provided the lug 70 extending laterally therefrom as shown in Figures 1 and 2. Mounted on the inside of the housing 11 is a rocking plate 71 having a torsion spring 72 attached thereto which normally holds the plate 71 in the position shown in the Figure 10, with the shoulder 73 resting against the stop 74.

Also mounted on the inside of the housing 11 is the rocking plate 75 rigidly carried on the shaft 76 which extends through the housing 11 and has on the outside of the housing a plate 77 fastened thereon. Mounted to swing on the shaft 76 is an arm 78 which carries a screw 79. This screw engages in a curved slot 80 formed in the plate 77, and permits the adjustment of the arm 78 on the plate 77, then the screw 79 is tightened up. The plate 75, shaft 76, plate 77 and arm 78 all move together as one unit. The arm 78 is engaged by the lug 70 on the rocker arm 69 so that when the throttle valve and its shaft is turned far enough the lug 70 then engages with the arm 79 and moves the plate 75.

Figure 10:
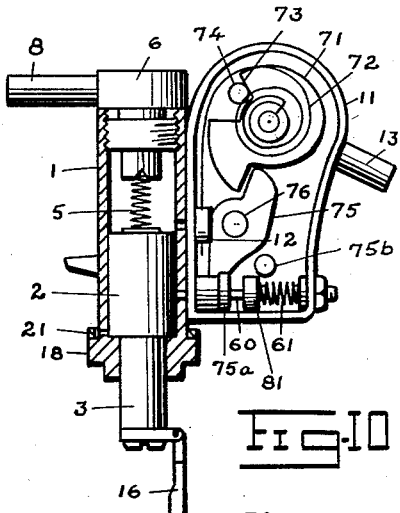
Figure 10 is a section similar to the section shown in Figure 7 with the thermostat spring and upper locking pin omitted.

The plate 75 is moved by the accelerator through the shaft 76 and its movement to the left in Figure 10 is arrested by the stud 75b. A small amount of lost motion is allowed between the upper end of the plate 75 and the lower end of the plate 71.

The lower end of the plate 75 extends out at right angles to form a lug 75a thereon which lug has a hole therein. The pin 60 passes through this hole and when the plate 75 swings this lug strikes a shoulder 81 on the pin and moves it to the right in Figure 11 drawing the pin to the right in Figure 11 out from under the piston permitting the spring 5 to push the piston down to release the float and the needle valve and permits the float to rise as the level of gas in the float chamber rises. This happens only when the vacuum is low enough or when the accelerator is depressed.

Figure 9:
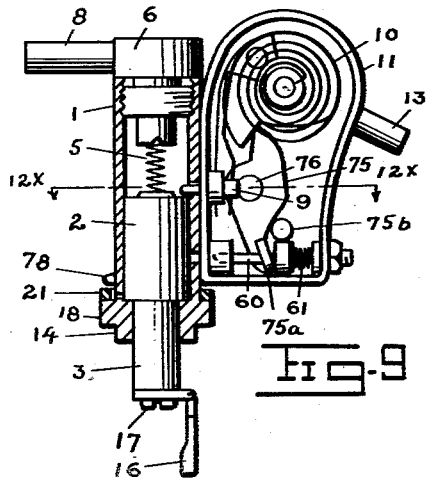
Figure 9 is a section similar to the section shown in Figure 8 with the locking pin that holds the piston up withdrawn by the accelerator pedal and showing the piston in its lowest position.
Figure 11:
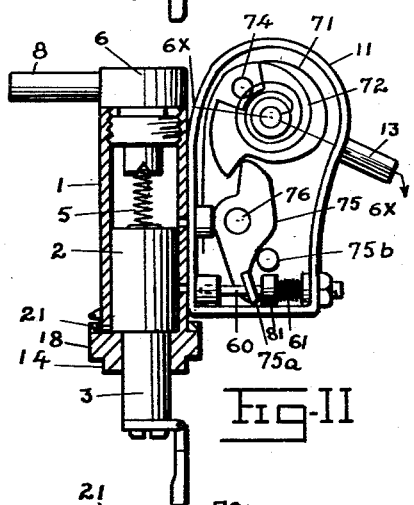
Figure 11 is a section similar to the section shown in Figure 10 with the lower locking pin that holds the piston up positively held back out of contact with the piston by the accelerator pedal.

When the throttle is wide open and the plate 75 is moved to the position shown in Figure 11 the upper end of plate 75 engages with a shoulder on the plate 71 and swings it from the position shown in Figures 7, 8 and 10 to the position shown in Figures 9 and 11. This turns the axis of the thermostat spring and causes it to push the pin 9 to the left in the several Figures 9 and 10 and causes the pin 9 to engage over the piston 2 and hold it down even though the spring is hot. This allows the float to rise to its normal position.

As soon as the accelerator pedal is released the extension 69 is raised releasing the assembly composed of the parts 75, 77 and 73; this in turn permits the spring 72 to turn the plate 71 to its normal position so that the thermostat spring 10 and pin 9 function normally, that is, so that the pin 9 will be withdrawn from the top of the piston 2 when the thermostat spring heats up.

The vacuum in the cylinder 1 will then draw up the piston 2 and the pin 60 will move forward under the piston and lock the piston up and this cycle of operations will be repeated every time the throttle valve is moved into nearly wide open position and out therefrom, providing, of course the thermostat spring has first been warmed up and the engine is in motion.

In Figures 3 and 4 I have shown a torsion spring 78a which is coiled around the shaft 76 and one end of which is fastened in the plate 77 as indicated at 78b and the other end of it 78c bears against the elbow 13d. This spring causes the arm 78 to move from the dotted line position to the full line position shown in Figure 4 when the accelerator pedal is released.

The foregoing describes the combination or assembly of my improved thermostat control of the level of gasoline in the carburetor as it is used in connection with the so-called Ford carburetor or any other carburetor in which the gasoline is fed into the float chamber from the side, as is shown in Figure 8 of my prior application #446,908 now Patent No. 2,340,876, issued February 8, 1944. That is to say in all such carburetors the needle valve moves horizontally to open and close the inlet and in such corburetors the wedge 16 can be used.

In the so-called Chevrolet carburetor and other similar carburetors, the inlet for the gasoline is in the cover of the bowl of the carburetor and in such carburetors the needle valve moves up and down to close and open the inlet. In carburetors of that type the wedge 16 cannot be used.

With carburetors of this latter type I use a thermostat control which will now be described.

Figure 15:
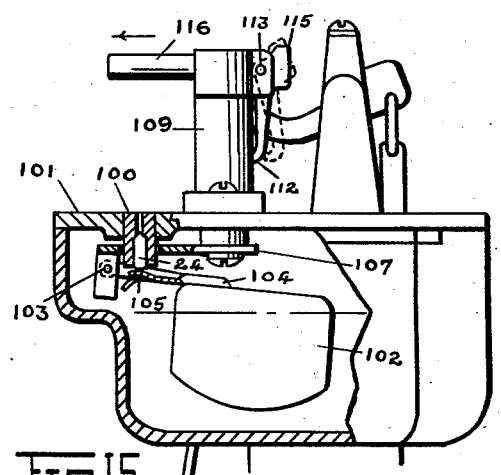
Figure 15 shows the same carburetor as is shown in Figure 14 with the piston raised slightly or the normal amount and with the float depressed.

As shown in Figure 15 the needle valve 24 moves up and down in the intake 100 and the cover plate 101. The float 102 is carried on an arm 104 which swings on a pivot 103. It is provided with a lug 105 that bears on the needle valve 24. The float 102 and arm 104 and pivot 103 constitutes a lever of the second class but in this case the pivot 103 and the bracket 106 in which it is carried is not stationary with reference to the bowl of the carburetor, but is moved up and down in a manner that will now be described. The bracket 106 is carried on the end of an arm 107 which is rigidly mounted on the lower end of the piston 108 which moves up and down in the cylinder 109.

The arm 107 has a hole 107a therein which encircles the lower end of the intake 100 which intake is provided with a seat for the needle valve. The loose engagement between the arm 107 and the intake 100 acts as a guide for the arm 107 and prevents it from swinging.

When a vacuum is produced in the cylinder 109 the piston 108 and the arm 107 and the pivot 103 all move up together until the arm 107 bears against the lower end of the cylinder by which its upward movement is arrested. A movement of $\tfrac{1}{16}''$ or less is sufficient for the purpose of my invention. This movement is sufficient to close the needle valve 24 as long as the float 102 is held up by the level of the gas. When the level of the gas drops the float 102 will drop and will permit the needle valve 24 to open, but under those circumstances the level of gas is then maintained at a lower level which will give a lean mixture to the engine.

Figure 17:
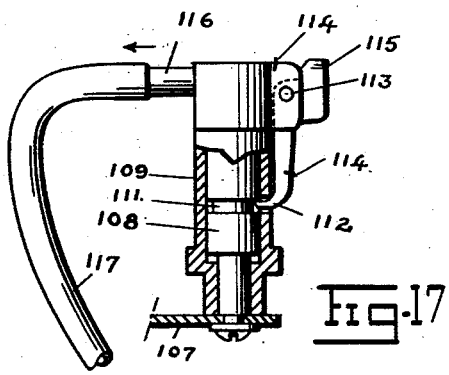
Figure 17 is a side elevation of the cylinder and piston shown in Figures 14 and 16, the cylinder being partly broken away and the piston being shown locked in raised position.
Figure 19:
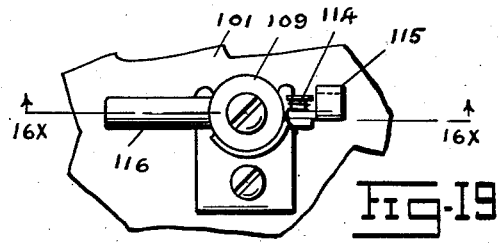
Figure 19 is a top plan view of the part shown in Figures 16 and 17.
Figure 18:
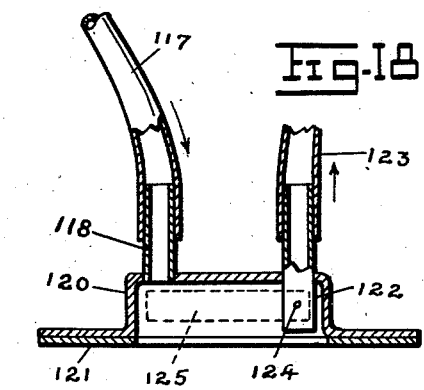
Figure 18 is a sectional view of the housing that is attached to the engine through which the air is drawn into the intake manifold, the section being taken on the line 18x—18x of Figure 20.

The piston 108 is held up by the vacuum and it is pushed down by the spring 110. This piston 108 has an annular groove 111 therein in which engages a locking finger 112 pivotally mounted at 113 on the outside of the cylinder. This finger projects through a hole in the side of the cylinder for the purpose of engaging in the groove 111 and holding the piston up in its raised position so that rapid fluctuations in the vacuum will not change the position of the piston and will therefore not change the level of the gasoline in the float chamber. The finger 112 is spring pressed and is held in the position shown in Figure 17 by a spring 114. Integral with the finger 112 is an arm 115 by which the finger can be withdrawn from engagement with the cylinder.

This arm is shaped so that it will be engaged by a rocker arm, suitably mounted on the cover of the carburetor which rocker arm is operated from the accelerator pedal and is part of the standard equipment of carburetors and constitutes no part of my invention, which invention operates only on the needle valve and the float to control the level of the gasoline in the float chamber. How the gas gets out of the float chamber and gets into the mixing chamber is already fixed in standard carburetors to which my invention can be applied and is no part of my invention.

If the piston 108 was raised directly by the vacuum of the intake manifold it would reduce the level of gasoline in the float chamber prematurely after the engine had started and while the engine was still cold, causing a lean mixture to be fed to a cold engine.

To prevent the vacuum of the intake manifold from raising the piston 108 prematurely, I provide a thermostat control which prevents the vacuum from raising the piston 108 until the engine has warmed up. At the top of the cylinder is a tube 116 corresponding to the tube 8 in Figure 1. Connected to this tube is a tube 117 which in turn connects to a tube 118 which tube is integral with the housing 120 which housing is fastened to some hot spot on the engine with a ring gasket 121 which will seal the opening and make it air tight.

In this housing is sealed another tube 122 which is connected by a tube 123 with the intake manifold. The tube 122 is closed at the bottom and has a small opening 124 therein which is normally closed by the end of the thermostat spring 125. On the end of this spring is carried a layer of soft packing 126 which is adapted to completely seal the opening 124. The connection to the tubes 118 and 122 can be reversed but in such case the vacuum would tend to draw the seal away from the opening 124 and would weaken the force of the spring while as shown the vacuum helps the spring to seal the opening.

When the engine is started and until the engine warms up the thermostat spring 125 will keep the opening 124 closed so that no vacuum will be communicated from the intake manifold to the housing 120, tube 117 to the cylinder 109, but as soon as the engine warms up the thermostat spring 125 will bend and uncover the opening 124 which will then draw air from the housing 120 causing a vacuum therein which in turn will produce a vacuum in the upper end of the cylinder 109 and raise the piston 108, compressing the spring 110. When the piston 108 is raised far enough the spring pressed finger 112 will engage in the groove and hold the piston up until the accelerator pedal is pushed down far enough to open the throttle valve fully or nearly so in which case the finger 112 will be withdrawn so that the piston 108 can descend if there is no vacuum to hold it up.

Figure 21:
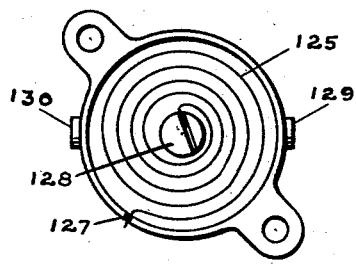
Figure 21 is a bottom plan view of a modified form of the housing shown in Figure 20.

In Figure 21 I have shown a modified form of the housing 120 in which case the housing does not have to be packed air tight to the engine. Inside of the housing is the thermostat spring 125 the outer end of which is anchored at 127. The inner end of the spring is connected to a valve 128 which turns on a sleeve 129a and as the spring heats up it turns the valve and connects the tube 129 with a tube 130 so that the vacuum is drawn through both tubes. In this case no vacuum will be communicated to move the piston 108 until the engine has warmed up.

The tubes 129 and 130 are integral with a sleeve 131 which makes a close sliding fit with the housing so that it can be set in the correct position with reference to the valve 128 so that the valve 128 will remain closed as long as the engine is cold and will be opened by the thermostat spring when the engine warms up.

Figures 33, 35:
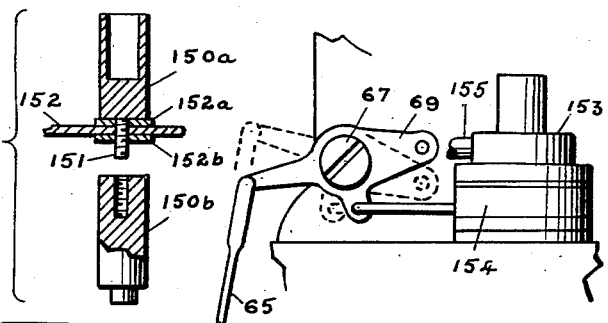
Figure 33 is a detail view showing the assembly of the upper and lower parts of the piston and the washers and the diaphragm.
Figure 35 is a diagrammatic view of a portion of the carburetor and the thermostatic control.
Figure 28:
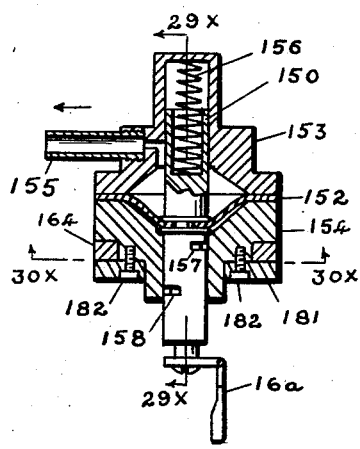
Figure 28 is a vertical section taken on the line 28x—28x of Figure 27 showing the piston in its lowest position.
Figures 29, 34:
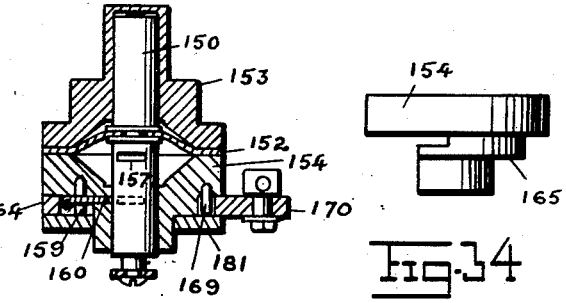
Figure 29 is a sectional view on the line 29x—29x of Figures 27 and 28 showing the piston in its raised position.
Figure 34 is a detail view of the lower member of the housing forming the chamber for the diaphragm.

In Figures 28 and 29 I have shown a modification of the cylinder and piston that is used for regulating the position of the float level in the carburetor. In this figure I have shown a stem or piston 150 which is made of two parts 150a and 150b. These parts are coupled together by a male and a female screw thread as shown in Figure 33. On the male thread 151 is placed two washers between which is clamped a flexible diaphragm 152. This connection between the diaphragm and piston keeps the piston from turning on the diaphragm for a purpose that will be explained presently. The outer edges of this diaphragm 152 are clamped between the upper and lower members of the housing 153 and 154 so that the diaphragm cannot turn in the housing.

Figure 14:
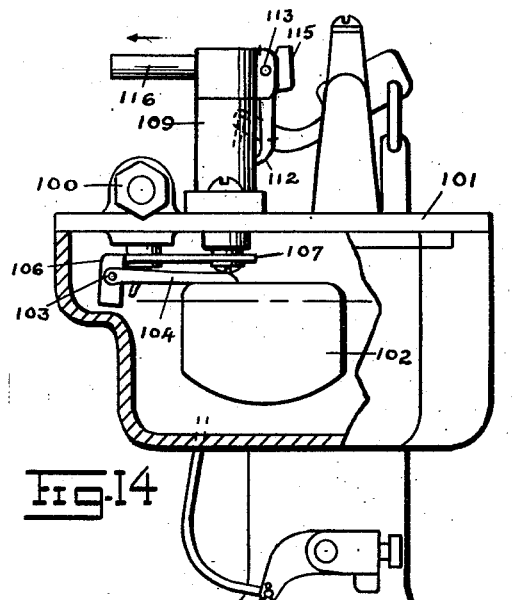
Figure 14 is a side elevation of the carburetor in combination with my improved thermostatic control device, the thermostatic control device being placed outside and on top of the carburetor such as is used on the Chevrolet car, and the float chamber of the carburetor being shown partly broken away and in section with the piston in low position and the float in the high position.
Figure 16:
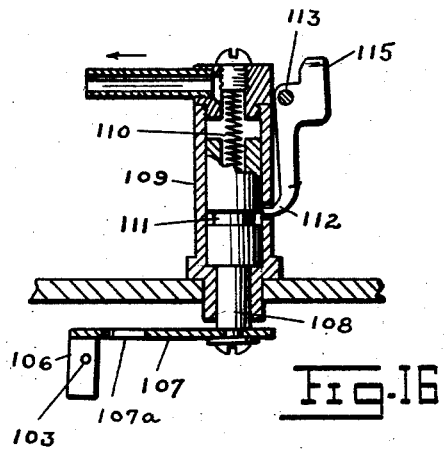
Figure 16 is a section through the cylinder and piston shown on top of Figures 14 and 15, the section being taken on the line 16x—16x of Figure 19.
Figure 20:
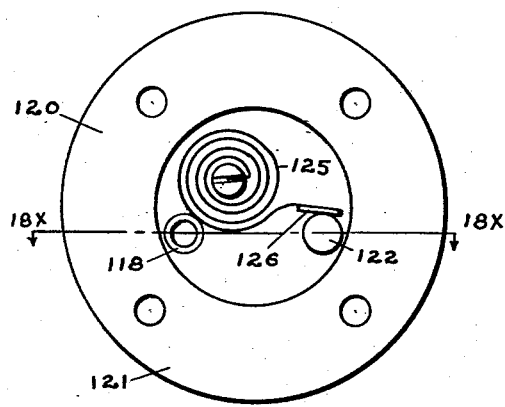
Figure 20 is a bottom plan view of the housing that is attached to the engine with the thermostat spring enclosed therein.
Figure 24:
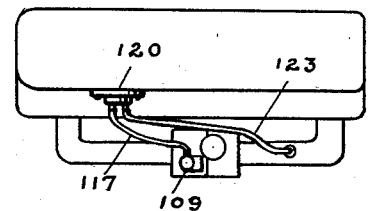
Figure 24 is a diagrammatic view of the thermostatic control device applied to the engine and carburetor of the so-called Chevrolet type.

From the upper member of the housing 153 extends a tube 155 which is connected to the thermostat regulating device such as is shown in either Figure 20 or 21 so that a vacuum can be produced inside of the upper member 153. A spring 156 is provided in the upper member of the housing pressing on the piston 150 and holds it down. The lower end of the piston 150 carries a wedge such as 16 or 16a that operates on the float or is connected to the arm 107 as is shown in Figures 14, 15 and 16 to depress the float.

The upper and lower members of the housing are cut away to form a chamber that permits the diaphragm to swing up or down as it moves with the piston, it being understood that in the modification as shown in Figure 28 the piston does not make a close fit with the housing but the diaphragm makes a tight fit with the housing. The upper and lower members of the housing merely act as loose fitting guides for the piston. The upper housing makes a loose and the lower housing makes a tight but a free sliding fit with the piston.

Two slots are cut laterally in the side of the piston at different elevations as indicated at 157 and 158. These slots will be spaced on a Ford assembly about $\frac{5}{16}$" apart between centers on the cylinder, one above the other, the spacing apart being determined by the length of the stroke that it will be necessary to give to the piston which length of a stroke may be different in different carburetors. It will also be understood that these slots are placed out of line with each other on the cylinder by about 117° between centers.

These slots 157 and 158 are used for the purpose of locking the piston in either its lowest or highest position. For this purpose I provide a rocker arm or escapement comprising a shaft 159 on which swings loosely a plate 160. This plate has two teeth thereon, 160a and 160b. The tooth 160a is adapted to engage in the lower slot 158 and the tooth 160b is adapted to engage in the upper slot 157.

When the piston is in its lowest position the plate 160 can engage with the upper slot and when the piston is at its highest position the plate 160 can engage with the lowest slot. The piston will ordinarily be in the one extreme position or the other. It will be held in its lowest position by the spring 156 and it will be raised to the highest position by the vacuum which vacuum can not be communicated to it until the thermostat regulating device has been warmed up as heretofore explained.

This piston 150 is moved up by the vacuum which can only happen after the engine has warmed up and the thermostat has opened the vacuum line.

Figure 32:
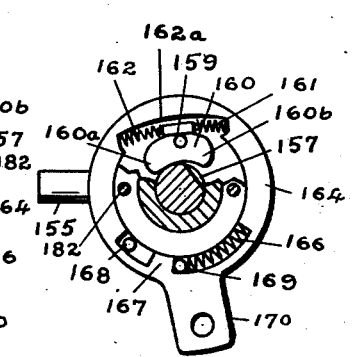
Figure 32 is a section on the line 30x—30x of Figure 28 looking up from below and showing the parts in the position that they occupy when the piston is down and unlocked.

When the car is cold and the accelerator pedal is raised the plate 160 is in neutral position as shown in Figure 32.

This is due to the fact that the spring 161 is longer than the spring 162 and tends to hold the plate 160 off center, that is, with the tooth 160b out of engagement with the upper slot 157 with which it is in line and with the tooth 160a pressed against the cylindrical part of the piston on the opposite side thereon. When the piston is pulled up by the vacuum and lower slot 158 is in the raised position, then the tooth 160a will engage with the lower slot 158 and lock the piston in its raised position and it will remain in its raised position until the plate 160 is rocked by the accelerator pedal. This is accomplished in the following manner.

The lower part of the diaphragm chamber 154 has a mutilated boss 165 thereon which boss is cut away to receive the rocker plate 164 and the three springs 161, 162 and 166. This rocker plate is formed with a lug 167 which engages between two pins 168 and 169 by which its angular movement is limited, the angular movement being about 6°. This rocker plate has an arm 170 thereon which is connected directly or indirectly to the accelerator pedal, with a loose connection, that is, the movement of the accelerator pedal is not imparted to the movement of the arm of the rocker plate until the accelerator pedal is pushed nearly all the way down, that is, until the throttle valve is nearly wide open. When the rocker plate is moved from the position shown in Figure 31 to the position shown in Figure 30 the springs 166 and 162 are compressed and this rocks the plate 160 far enough to disengage it from the slot in the piston after which the piston is free to move downward unless it is held up by the vacuum. When it gets to the lower end of its movement the plate 160 will lock it in its lowest position as long as the throttle is wide open. This will cause the level of gas in the float chamber to rise to normal so that a normal mixture will be fed to the engine while it is pulling a heavy load on a wide open throttle. It will also be understood that the washers 152a and 152b on either side of the diaphragm extend out, and engage with the upper and lower chambers of the housing and these limit the upward and downward movement of the piston.

The piston 150 is held against turning on the diaphragm or in the housing as above described. This is necessary so that the slots 157 and 158 will always be held in line with the teeth 160a and 160b that are intended to engage therewith.

Figure 27:
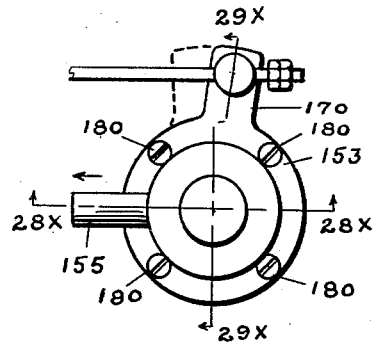
Figure 27 is a top plan view of the device in which the piston is operated in connection with the diaphragm.
Figure 30:
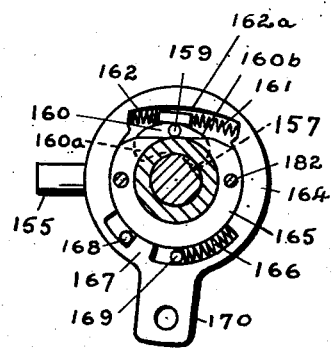
Figure 30 is a section on the line 30x—30x of Figure 28 looking up from below and showing the parts in the position that they occupy when the piston is locked down.
Figure 31:
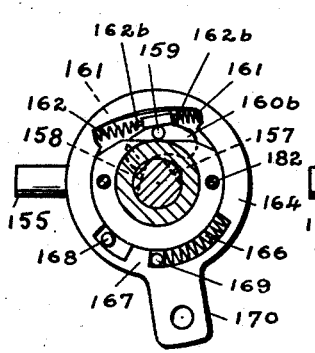
Figure 31 is a section on the line 30x—30x of Figure 28 looking up from below and showing the parts in the position that they occupy when the piston is locked up.

The upper and lower parts of the housing, namely, the parts 153 and 154 are held together by the four screws 180 shown in Figure 27 and the cover plate 181 is held in place by the screws 182 and this cover plate holds in place the spring shown in Figures 30, 31 and 32.

I have also found that it is desirable to put a blade spring 162a into recess back of the spring 161 and 162 and find that the springs function much better with the spring in place.

I also provide little projections or pins 162b for the purpose of holding one end of each of the two springs in place.

In Figures 7 to 12 inclusive I have shown a pin 60 by which the piston 2 is hold up so that it cannot descend.

In Figures 1, 2, 3 and 4 I have shown the arm 78 which is used for the purpose of withdrawing the pin 60 to release the piston 2. This is moved by the accelerator pedal as heretofore described.

Figure 25:
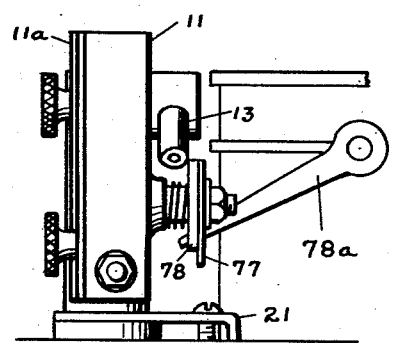
Figure 25 is an end elevation of the thermostat housing and a portion of the carburetor showing the arm attached to the butterfly choke valve by which the locking pin shown in Figure 8 is withdrawn by the operation of the carburetor choke which can be either manual or automatic.
Figure 22:
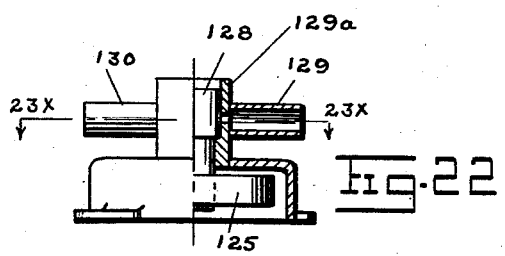
Figure 22 is a side elevation of the housing shown in Figure 21, one-half of it being shown in section.

As shown in Figure 25 I also provide an arm 78a carried on the shaft of the choke valve of the carburetor which shaft is moved by the choke. This arm also engages with the arm 78 for the purpose of withdrawing the pin 60 if necessary so that the piston will be returned to its lowest position. In this way the piston is released by operating the choke or the accelerator pedal.

Figure 26:
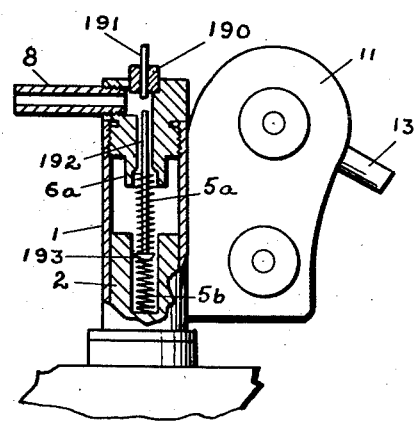
Figure 26 is a side elevation of the thermostat housing with the cylinder and piston shown in section showing also an insulated electrical contact at the top through which a signal can be operated when the piston is at the top of its movement such as is shown for example in Figure 8.
Figure 23:
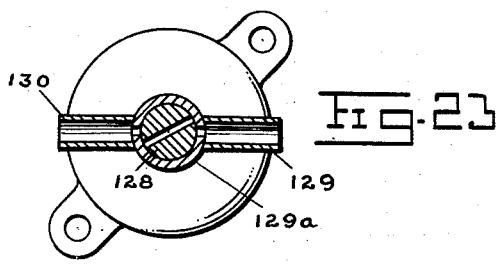
Figure 23 shows a section on the line 23x—23x of Figure 22.

In Figure 26 I have shown a signal device that can be added to any of the cylinder and piston devices shown herein. This consists of an insulator 190 having a contact 191 therein. Moving up and down with the piston 2 is a contact stem 192. This stem has a head 193 on the bottom thereof which head is embraced between the ends of two springs 5a and 5b. The upper spring is held in place by the head 6a and the lower spring is moved up with the piston which has a pocket therein with which the spring engages.

When the piston 2 moves up it pushes the stem 192 against the contact 191 and closes the circuit which can ring a bell or light a lamp to show the position of the control device.

In Figures 36, 37 and 38, I have shown a float chamber 200 larger than the ordinary float chamber in which float chamber I have provided two floats 201 and 202. Each of these floats operates on its needle valve independent of the other float. These floats and their needle valves are not under thermostat control but they are fed through a control valve to change the level of fuel in the float chamber in a way that will presently be described which control valve is controlled by a thermostat.

In the float chamber are provided the lugs 203, 203 arranged in pairs between each of which pairs of lugs one of the floats is pivotally mounted. The pivot openings in these lugs can all be in line with each other so that one rod can be inserted through all the openings and form a pivot for both floats. This rod can be inserted through the opening 204 in the side of the float chamber which can be closed in any suitable manner after the rod is inserted. The long rod or the four short pivots are all indicated by the reference numeral 205.

Each of the floats carries a float arm 206 or 206a that operates on a needle valve 207. Connected with the float 201 is the arm 206, the needle valve 207 and the seat 208 for the needle valve, connected with the float 202 is the float arm 206a, the needle valve 207a and the needle valve seat 208a.

The needle valve seats are connected to ducts 209 and 209a which are in the form of a Y and are connected to an inlet 210. At the junction of the ducts 209 and 209a with the inlet 210 is a control valve 211 which permits the fuel to flow into either one duct or the other duct but prevents the fuel from flowing to both of the ducts at the same time. This control valve is connected to a piston which as is shown in Figures 7 and 8 etc. and is raised and lowered by a thermostatically controlled assembly such as is shown in Figures 1 and 2 of the drawings of this application.

When the control valve is in its lowest position it diverts the fuel into the duct 209 and when it is in its highest position it diverts the fuel into the duct 209a.

The float 201 is set so that it will admit fuel into the fuel chamber up to the high or standard level and shut it off at the high level and the float 202 is set so that it will admit fuel into the fuel chamber up to the low level and shut it off when the low level has been reached.

The control valve 211 is shown separately in detail in Figures 39 and 40 and is shown in the assembly in Figures 36 and 37. This control valve 211 is a piston valve and moves up and down on its long axis in a cylindrical chamber 215 provided therefor. As shown in Figure 37 the control valve is provided with a groove or guide 216 with which engages a pin 217 which holds it from turning in its chamber. This pin is carried on a screw that is threaded into the housing from the float chamber.

When the control valve is in its lowest position the port 214 is closed against the inlet 210 by the valve chamber as shown in Figure 36 and the port 213 is open at one end to the duct 209 and at the other end to the inlet 210. The fuel then flows through the inlet opening 210, port 213 and duct 209 to the needle valve 207, as shown in Figures 36 and 37.

When the control valve is in its highest position the port 213 will be closed against the inlet port 210 and the port 214 will be open to the duct 209a and the fuel then flows through the inlet opening 210, port 214 through the duct 209a to the needle valve 207a.

If the control valve is in the lowest position as shown in Figure 36 the fuel will flow to the left and if the control valve is in the highest position the fuel will flow to the right and as shown in Figure 36. It cannot flow both to the right and to the left at the same time.

To pack the control valve 211 so that fuel cannot flow past the upper or the lower end of the valve into the cylindrical valve chamber 215, I provide a gasket 218 on the top and bottom of the valve. This is a standard gasket having a bell-shaped leather cover held distended by a wire coiled in a helix and formed in a closed ring as shown at 219 in Figure 41. The gasket 218 is held on the bottom of the piston by washer 220 and screw 221. On the top of the piston it encircles the stud 222 which connects the valve to the piston of the thermostat assembly such as is shown in Figures 37, 38 and 39. The stud 222 is substituted for the screw 17 shown in Figures 7 and 9, and the valve is substituted for the wedge 16. It will be understood that the control valve 211 does not control the position of either float or the position of its needle valve that is opened and closed by the float, but merely regulates the flow of gasoline to the one needle valve or the other.

When the control valve is in its highest position it will permit fuel to flow to the right in Figures 36 and 37 past the needle valve 207a until the float 202 rises and closes the needle valve with the fuel in the fuel chamber at the low level. When the control valve 211 is in its lowest position it will permit the fuel to flow to the left in Figures 36 and 37 past the needle valve 207. The fuel will fill the fuel chamber to the high level when the float 201 will rise and shut off the flow of fuel.

When the fuel passes above the low level, the float 202 will close its needle valve 207a, but this will merely be idle because the fuel cannot flow in that direction when the control valve 211 is in its lowest position, that is, in the position shown in Figure 36.

When the control valve is in its highest position the fuel will flow past the needle valve 207a until the low level is reached when the float 202 will close the needle valve 207a, but the needle valve 207 will then remain open idly because no fuel can flow in its direction.

Because of the way this assembly works the control valve 211 can always be open in either the high or the low position to the needle valve 207a and the ducts in the valve and the housing can be formed to permit this, but when in the high position the control valve 211 must be closed to the needle valve 207 otherwise the fuel would always be at the high level in the float chamber and the operation of the assembly would be defeated.

As above described in connection with the other figures the control valve will remain in the low position shown in Figure 36 when the engine is cold and until it warms up during which time the fuel in the fuel chamber will be held at the high level, but after the engine warms up the thermostat control assembly will raise the control valve and shut off the flow of fuel toward the needle valve 207 and thereafter the fuel will flow only through the needle valve 207a and the float 202 controlling the needle valve 207a will prevent or will hold the fuel in the float chamber down to the low level.

At the top of the valve chamber 215 is a bleed hole 225 and at the bottom of the valve chamber is a bleed hole 226. These holes permit the control valve to eject from the valve chamber into the float chamber any fuel that has leaked past the gaskets.

As shown in Figure 36 the ducts 209 and 209a are placed at an angle (rather than horizontal) so that the valve 211 can be placed below the cover 228 of the float chamber. The fuel inlets and their needle valves 207 and 207a are preferably located above the high level of the fuel of the float chamber.

In Figures 36 and 37, I have shown the boss 67 that supports the rocker arm 69 shown in Figures 1 and 2. It will be understood that this rocker arm can be placed in line with the arm 78 or can engage with it at right angles thereto. In Figure 36, I have shown the cover of the float chamber with an opening therein on which is provided a shouldered seat 230 that supports the thermostat control assembly shown in Figures 1 and 2 of this application. The seat is recessed on the lower side to receive an annular packing ring which packing ring is held in place by the washer 231 which in turn is supported by that part of the housing that contains the valve 211. This is formed so as to seal against any leak of fuel through the seat or connection by which the thermostat control assembly is fastened to the cover of the carburetor.

I claim:

1. In a device to regulate the depth of gasoline in the float chamber of a carburetor, a float and a valve for maintaining the gasoline at a standard level, a regulating device that will depress the float and hold the valve closed until the level of gasoline in the float chamber is sensibly reduced, said regulating device comprising a connection between the intake manifold of the engine and a hot spot that will draw a current of air through the regulating device while the engine is running without depressing the float and will cause the float to be depressed after the air passing through the regulating device has become sufficiently warmed up, a thermostat affected by said warm air, a piston held against movement by said thermostat until the air becomes warm enough to cause it to release the piston, the vacuum of the intake manifold then causing the piston to move and depress the float and hold it in depressed position with the valve closed, means for positively holding the piston in its moved position during fluctuations in the vacuum.

2. A carburetor having a needle valve, a float chamber and a float and a float arm, said float and float arm being adapted to hold the needle valve closed, when the gasoline reaches a standard level in the float chamber, a wedge, regulating means for interposing said wedge between the float arm and the needle valve and holding it closed until the gasoline had dropped to a lower level in the float chamber, said means operating to lower the level of the gasoline in the float chamber only after the engine is operating and warmed up, said means comprising a tubular connection between the intake manifold of the engine and a hot spot that will draw a current of warm air through the regulating means, a thermostat in said regulating means, a piston held against movement by the thermostat, said thermostat being moved by the warm air to release the piston, a vacuum for causing the piston to move the wedge between the float arm and the needle valve and hold it there while the engine runs, means for positively holding the piston and wedge in its moved position during fluctuations of the vacuum.

3. In a device to regulate the depth of gasoline in the float chamber of a carburetor, means for maintaining the gasoline at a standard level while the engine is warming up, said means operating to shut off the inflow of gasoline in the float chamber after the engine is warmed up until the level of gasoline in the float chamber has been substantially reduced, said means then holding the valve closed while the gasoline is above the reduced level while the engine runs, said means comprising a float, a float arm and a needle valve, a wedge having a thick part and a thin part, the thin part being normally interposed between the float arm and the needle valve when the engine is cold, means for moving the wedge so as to draw the thick part of the wedge between the float arm and the needle valve after the engine warms up thereby causing the float to close the needle valve when the gasoline in the float chamber is at a lower level, a pin engaging under the piston for holding it in moved position.

4. In a device to regulate the depth of gasoline in the float chamber of a carburetor, means for maintaining the gasoline at a standard level while the engine is warming up, said means operating to shut off the inflow of gasoline in the float chamber after the engine is warmed up until the level of gasoline in the float chamber has been substantially reduced, said means then holding the valve closed while the gasoline is above the reduced level while the engine runs, said means comprising a float, a float arm and a needle valve, a wedge having a thick part and a thin part, the thin part being normally interposed between the float arm and the needle valve when the engine is cold, means for moving the wedge so as to draw the thick part of the wedge between the float arm and the needle valve after the engine warms up thereby causing the float to close the needle valve when the gasoline in the float chamber is at a lower level, a pin engaging under the piston for holding it in moved position, means operated by the accelerator pedal for withdrawing the pin.

5. In a device for regulating the depth of gasoline in the float chamber of a carburetor the combination of a float chamber, a float and a float arm and a needle valve closed thereby when the gasoline in the float chamber is at a standard level, a wedge and means for interposing the wedge between the float arm and the needle valve and holding it closed until the gasoline has dropped to a lower level said wedge and float then permitting the valve to open and to permit gasoline to flow into the float chamber to maintain the low level, said means including a vacuum control connected to the intake manifold and means for holding the wedge and float in its interposed position during fluctuations of the vacuum.

6. In a device for regulating the depth of gasoline in the float chamber of a carburetor, the combination of a float chamber, a float, a float arm and a needle valve closed thereby when the gasoline is at a high level, a regulating device that causes the float and its arm to close the needle valve until the gasoline is at a low level in the float chamber, said device comprising a wedge interposed between the needle valve and the float arm and a piston for moving the wedge, said piston and wedge being held against movement by a thermostat, said piston being released from said thermostat by a current of warm air, a vacuum for drawing the current of warm air and moving the piston and wedge after the piston has been released from the thermostat, means for holding the piston and wedge in its interposed position during fluctuations of the vacuum.

7. In a device to regulate the depth of gasoline in the float chamber of the carburetor, means for maintaining the level of the gasoline at a high level when the engine is idle and during the warming up period of the running of the engine, a regulating device operating to lower the level of the gasoline in the float chamber after the engine is warmed up and hold it at the lower level, said regulating device comprising a connection between the intake manifold of the engine and a hot spot that will draw a current of warm air through the regulating device and at a partial vacuum through a part of the regulating device while the engine is running after it has warmed up and will maintain a partial vacuum in a part of the regulating device while the engine is running, means for holding the regulating device in position to hold the gasoline at the lower level in the float chamber during fluctuations of the vacuum.

8. In a device to regulate the depth of gasoline in the float chamber of a carburetor means for maintaining the gasoline at a standard level while the engine is warming up, said means operating to shut off the inflow of gasoline in the float chamber after the engine is warmed up until the level of gasoline in the float chamber has been substantially reduced, said means then holding the gasoline at the reduced level while the engine runs, said means comprising a float, a float arm and a needle valve, a wedge interposed between the float arm and the needle valve, said wedge having a thick part and a thin part, the thin part being normally interposed between the float arm and the needle valve when the engine is cold, means for moving the wedge so as to draw the thick part of the wedge between the float arm and the needle valve after the engine warms up, the thick part of the wedge and the float operating to hold the needle valve closed when the gasoline in the float chamber is at low level, the thin part of the wedge and the float operating to hold the needle valve closed when the gasoline is at a high level in the float chamber, said means also including a vacuum control connected to the intake manifold and means for holding the thick part of the wedge between the float arm and the needle valve during fluctuations of the vacuum.

9. In a device to regulate the depth of gasoline in the float chamber of a carburetor means for maintaining the gasoline at a standard level while the engine is warming up, said means operating to shut off the inflow of gasoline in the float chamber after the engine is warmed up until the level of gasoline in the float chamber has been substantially reduced, said means then holding the gasoline at the reduced level while the engine runs, said means comprising a float, a float arm and a needle valve, a wedge interposed between the float arm and the needle valve, said wedge having a thick part and a thin part, the thin part being normally interposed between the float arm and the needle valve when the engine is cold or idle, a cylinder and a piston, said cylinder being connected to the intake manifold so that the piston will be moved by the vacuum created therein, a thermostat spring normally holding the piston against movement when the engine is cold, a housing in which said thermostat spring is enclosed, said housing being connected on one side to a hot spot on the engine or exhaust manifold, and being connected on the other side to the cylinder and intake manifold; so that on the operation of the engine air is drawn thru the housing and cylinder into the intake manifold, the air when it becomes warm enough causing the thermostat spring to bend and release the piston so that it can move in response to the vacuum of the intake manifold and move the wedge so as to close the needle valve until the gasoline in the float chamber has moved to a lower level, means for holding the piston in its moved position during fluctuations of the vacuum.

10. In a device for regulating the depth of gasoline in the float chamber of a carburetor, the combination of a float chamber, a float, a float arm and a needle valve closed thereby when the gasoline is at a high level, a regulating device that causes the float and its arm to close the needle valve when the gasoline is at a low level in the float chamber, said device comprising a wedge interposed between the needle valve and the float arm and a piston for moving the wedge, said piston and wedge being held against movement by a thermostat, said piston being released from said thermostat by a current of warm air, a vacuum for drawing the current of warm air and moving the piston and wedge after the piston has been released from the thermostat, a spring for returning the piston and wedge to normal position on the failure of the vacuum, means for holding the piston and wedge in its interposed position against the pressure of the spring during fluctuations of the vacuum.

11. In a device for regulating the depth of gasoline in the float chamber of a carburetor, the combination of a float chamber, a float and a float arm and a needle valve closed thereby when the gasoline in the float chamber is at a standard level, means operated by the vacuum of the intake manifold for reducing the level of the gasoline in the float chamber to a level lower than the standard level after the engine is in operation, and means for holding the gasoline at the reduced level during fluctuations of the vacuum.

12. In a device for regulating the depth of gasoline in the float chamber of a carburetor, the combination of a float chamber, a float and a float arm and a needle valve closed thereby when the gasoline in the float chamber is at a standard level, means operated by the vacuum of the intake manifold for reducing the level of the gasoline in the float chamber to a level lower than the standard level after the engine is in operation and said last named means being controlled by the accelerator pedal.

13. In a device for regulating the depth of gasoline in the float chamber of a carburetor, the combination of a float chamber, a float and a float arm and a needle valve closed thereby when the gasoline in the float chamber is at a standard level, means operated by the vacuum of the intake manifold for reducing the level of the gasoline in the float chamber to a level lower than the standard level after the engine is in operation, said means comprising a piston moved in one direction by the vacuum of the intake manifold and moved in the other direction by a spring, a pin for holding the piston against movement by the spring if the vacuum drops, a connection between the pin and the accelerator pedal for withdrawing the pin.

14. In a device for regulating the depth of gasoline in the float chamber of a carburetor, the combination of a float chamber, a float and a float arm and a needle valve closed thereby when the gasoline in the float chamber is at a standard level, means operated by the vacuum of the intake manifold for reducing the level of the gasoline in the float chamber to a level lower than the standard level after the engine is in operation, said means comprising a piston moved in one direction by the vacuum of the intake manifold and moved in the other direction by a spring, a pin for holding the piston against movement by the spring if the vacuum drops, a loose connection between the pin and the accelerator pedal for withdrawing the pin after the accelerator pedal has moved part way.

15. In a carburetor the combination of a float chamber, means for holding the fuel in said chamber at a high level, a second named means for holding the fuel in said chamber at a low level, a valve controlling the feed of fuel, said valve being capable of occupying either of two positions in one of which positions it feeds the fuel to the first named means and in the other position it feeds the fuel to the second named means.

16. In a carburetor the combination of a float chamber, means for holding the fuel in said chamber at a high level, a second named means for holding the fuel in said chamber at a low level, a valve controlling the feed of fuel, said valve being capable of occupying either of two positions in one of which positions it feeds the fuel to the first named means and in the other position it feeds the fuel to the second named means, and means for moving said valve to the one position or the other.

17. In a carburetor the combination of a float chamber, means for holding the fuel in said chamber at a high level, a second named means for holding the fuel in said chamber at a low level, a valve controlling the feed of fuel, said valve being capable of occupying either of two positions in one of which positions it feeds the fuel to the first named means and in the other position it feeds the fuel to the second named means, a piston connected to said valve, a cylinder in which said piston moves which cylinder is connected to the intake manifold so that the piston and valve move in response to changes in the vacuum of the intake manifold.

18. In a carburetor the combination of a float chamber, means for holding the fuel in said chamber at a high level, a second named means for holding the fuel in said chamber at a low level, a valve controlling the feed of fuel, said valve being capable of occupying either of two positions in one of which positions it feeds the fuel to the first named means and in the other position it feeds the fuel to the second named means, a piston connected to said valve, a cylinder in which said piston moves which cylinder is connected to the intake manifold so that the piston and valve move in response to changes in the vacuum of the intake manifold, a thermostat warmed by the engine cylinder which thermostat holds the piston against movement while the engine cylinder is cold and releases the piston so that it can be moved by the vacuum of the intake manifold when the engine cylinder warms up.

19. In a device for regulating the depth of gasoline in the float chamber of a carburetor, the combination of a float chamber, a float and a float arm and a needle valve closed thereby when the gasoline in the float chamber is at a standard level, means operated by the vacuum of the intake manifold for reducing the level of the gasoline in the float chamber to a level lower than the standard level after the engine is in operation and said last named means being controlled by the accelerator pedal, a pivot on which the float swings, means for raising the pivot thus causing the float arm to press against the needle valve and causing the float to be held in a lower position in the float chamber.

LEWIS W. GILBERT.

REFERENCES CITED

The following references are of record in the file of this patent:

UNITED STATES PATENTS

| Number | Name | Date |
|---|---|---|
| 1,656,369 | Chandler | Jan. 17, 1928 |
| 1,491,987 | Harlan | Apr. 29, 1924 |
| 1,817,069 | Dickey | Aug. 4, 1931 |